United States Patent [19]

Kobayashi

[11] 4,454,446

[45] Jun. 12, 1984

[54] CATHODE RAY TUBE FOR A LIGHT SOURCE

[75] Inventor: Hiroo Kobayashi, Kyoto, Japan

[73] Assignee: Mitsubishi Denki Kabushiki Kaisha, Tokyo, Japan

[21] Appl. No.: 346,071

[22] PCT Filed: May 29, 1981

[86] PCT No.: PCT/JP81/00120

§ 371 Date: Jan. 25, 1982

§ 102(e) Date: Jan. 25, 1982

[87] PCT Pub. No.: WO81/03581

PCT Pub. Date: Dec. 10, 1981

[30] Foreign Application Priority Data

May 29, 1980 [JP] Japan ........................ 55-72383

[51] Int. Cl.[3] ........................ H01J 29/86; C03C 3/30

[52] U.S. Cl. ........................ 313/480; 501/64; 358/237; 358/253

[58] Field of Search ........................ 313/480; 501/64; 313/478; 358/253, 237

[56] References Cited

U.S. PATENT DOCUMENTS

| | | | |
|---|---|---|---|
| Re. 30,015 | 5/1979 | Lipp | 313/473 |
| 2,552,125 | 5/1951 | Tillyer | 501/64 |
| 3,114,065 | 12/1963 | Kaplan | 313/472 |
| 3,143,683 | 8/1964 | Duncan et al. | 313/480 X |
| 3,528,829 | 9/1970 | Baak et al. | 501/64 X |
| 3,875,449 | 4/1975 | Byler et al. | 313/466 |
| 4,376,829 | 3/1983 | Daiku | 313/480 X |

*Primary Examiner*—Palmer C. Demeo
*Assistant Examiner*—Sandra L. O'Shea
*Attorney, Agent, or Firm*—Sughrue, Mion, Zinn, Macpeak and Seas

[57] ABSTRACT

In a cathode ray tube for a light source, a fluorescent surface adapted to emit light having one of three colors, red, green and blue is formed on the inner surface of a face plate which is provided at one end of a vacuum envelope, and an electron gun is disposed at the opposite end of the vacuum envelope in such a manner as to confront the fluorescent surface, at least the face plate being made of a glass material containing rare earth oxides $Nd_2O_3$ and $Pr_2O_3$, so that satisfactory color light and contrast are obtained even under the sun light.

2 Claims, 4 Drawing Figures

CATHODE RAY TUBE FOR A LIGHT SOURCE

TECHNICAL FIELD

This invention relates to cathode ray tubes for a light source, which form the picture elements of a large scale display apparatus.

BACKGROUND ART

In a conventional large scale display apparatus which is used for instance as an electric light display board at a baseball field or for displaying advertisement pictures on the roofs or walls of buildings, a number of light bulbs arranged are selectively turned on and off to form pictures. Accordingly, the conventional display apparatus suffers from various problems.

Some of the problems will be described. In the case where light bulbs are used to form pictures, each light bulb emits light when the filament becomes red hot, and therefore the emitted light's color is red or white orange. To this end, it is rather difficult to obtain a large amount of blue or green light from a light bulb. In this light bulb system, in order to modulate the luminance of each picture, the currents applied to the filaments must be controlled on and off or varied. These light bulbs are considerably low in frequency response, lower than 10 Hz. Furthermore, as the applied current is not in linear relation to the intensity of emitted light, the system suffers from a problem that the emitted light's color is changed by the applied current. Thus, it is difficult to apply the system to the display of half-tones and to a color display in which optional light colors are to be composed. In general, light bulbs of 10 W or larger are used in such a large scale display apparatus. Therefore, if several ten of thousands of such light bulbs are arranged, then a considerably large electric power is consumed by the light bulbs and a considerably large amount of heat is generated by them.

In order to overcome these drawbacks, a method has been proposed in which cathode ray tubes are employed as the light sources of a display apparatus. More specifically, in the method, a number of small cathode ray tubes having fluorescent surfaces adapted to single-color lights, red, green and blue lights, are arranged to display a desired picture. If it is assumed that the efficiency of converting electrical energy to optical energy of a light bulb is 10 lm/W, then the conversion efficiency of a cathode ray tube is about 100 lm/W, thus being better by about one order of magnitude than that of the light bulb. In the case where cathode ray tubes are employed, a variety of phosphors adapted to emit various color lights as well as red, green and blue lights are available. Therefore, the light sources can be so designed as to emit desired color light, and are considerably high in frequency response. Accordingly, the use of the cathode ray tube makes it possible to display even a motion picture. Being able to change an emitted light luminance with respect to an input electrical signal with high fidelity, the cathode ray tube is most suitble for reproduction of half-tones. In the case where the cathode ray tubes are employed, the heaters are scarcely consumed when compared with the case where the light bulbs are employed and the currents applied to the filaments of the light bulbs are changed. Therefore, the former case is advantageous in service life.

However, almost all the phosphors of ordinary cathode ray tubes are substantially white, its optical reflection facter is about one, and the face plate of the cathode ray tube is made of transparent glass high in optical transmissivity. As a result, since the sun light may impinge through the face plate upon the phosphor, the color of light emitted from the fluorescent surface of the cathode ray tube becomes rather white. This results in the contrast being sometimes lost. Accordingly, in order overcome to such a difficulty, the display apparatus should be so designed that it provides a sufficient contrast even under sun light to meet the purpose of installation of the display apparatus. In order to meet this requirement, the following method has been proposed. In the method, pigment phosphor obtained by covering phosphor particle with pigment is used so as to allow phosphor to be used which has a color corresponding to the color of light emitted thereby. Alternatively the face plate glass or the vacuum envelope including the face plate glass is colored. The result is that under sun light, the color appears clear and the contrast is high. However, in order to allow these colored glasses to have primary colors, it is necessary to provide three different kinds of glass. This is not economical.

SUMMARY OF THE INVENTION

In this invention, cathode ray tubes are employed as the light sources of a large scale display apparatus. At least the face plate of a vacuum envelope forming each cathode ray tube is made of a glass material containing rare earth oxides which show an optical absorption characteristic over a particular wavelength range in the visible region, so that one or two kinds of glass are allowed to absorb external light without decreasing the energy of light emitted from the phosphor, whereby the color appears clear and the contrast is improved under sun light.

DETAILED DESCRIPTION OF THE PREFERRED EMBODIMENTS

Figure 1:
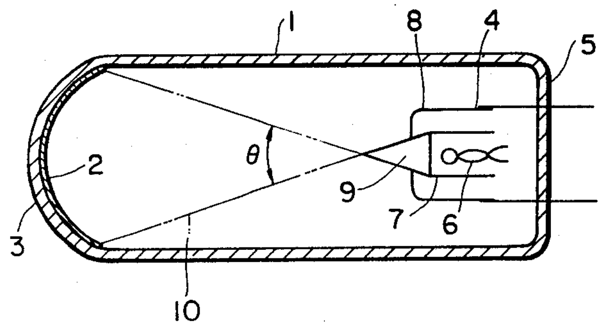
FIG. 1 is a sectional view of one example of a cathode ray tube for a light source according to this invention.

FIG. 1 shows one example of a cathode ray tube for a light source according to this invention. In FIG. 1, reference numeral (1) designates a vacuum envelope which is, for instance, in the form of a cylinder the inside of which is maintained at a vacuum. The vacuum envelope (1) is provided with a face glass (3) at one end, on the inside of which a fluorescent surface (2) is formed. An electron gun (4) for emitting a flood electron beam described later, and terminals for applying necessary voltages to various parts of the electron gun (4) are provided at the opposite end of the vacuum envelope. The opposite end is closed by a stem (5), so that the vacuum envelope 1 is completely sealed. In FIG. 1, reference numerals (6), (7) and (8) designate a heater, a cathode and a grid, respectively, which form the electron gun (4); (9) a hole formed in the center of the grid (8); and (10) a flood electron beam emitted by the electron gun (4).

The operation of the cathode ray tube thus constructed will be described. A voltage negative with respect to the cathode (7) is applied to the grid (8), and further a predetermined current is allowed to flow in the heater (6) to heat the cathode (7), so that the voltage of the grid (8) approaches the potential of the cathode (7). As a result, the electron beam (10) is emitted towards the fluorescent surface (2) from the cathode (7). The electron beam (10) thus emitted is formed into a non-focused beam having a predetermined angular spread $\theta$ depending on various conditions such as the diamter of the hole (9) at the center of the grid (8), the distance between the grid (8) and the cathode (7) and the anode voltage. The non-focused beam is applied to the fluorescent surface (2), whereby a light having a color depending on the fluorescent material is emitted from the fluorescent surface (2).

Figure 2:
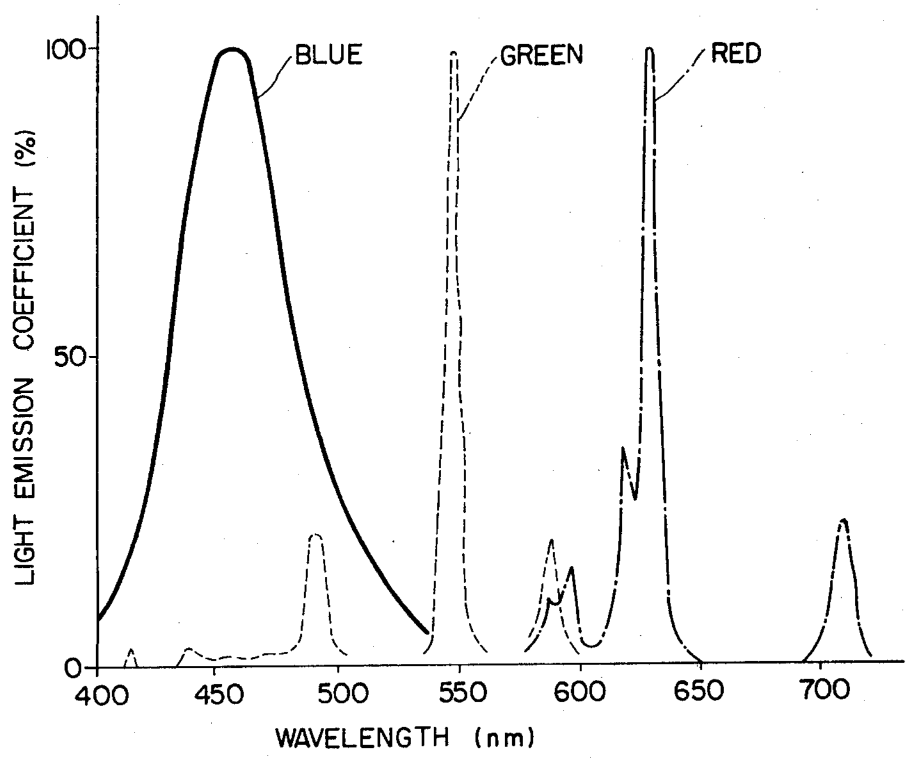
FIG. 2 is a diagram showing the emission spectrum characteristics of phosphors.
Figure 3:
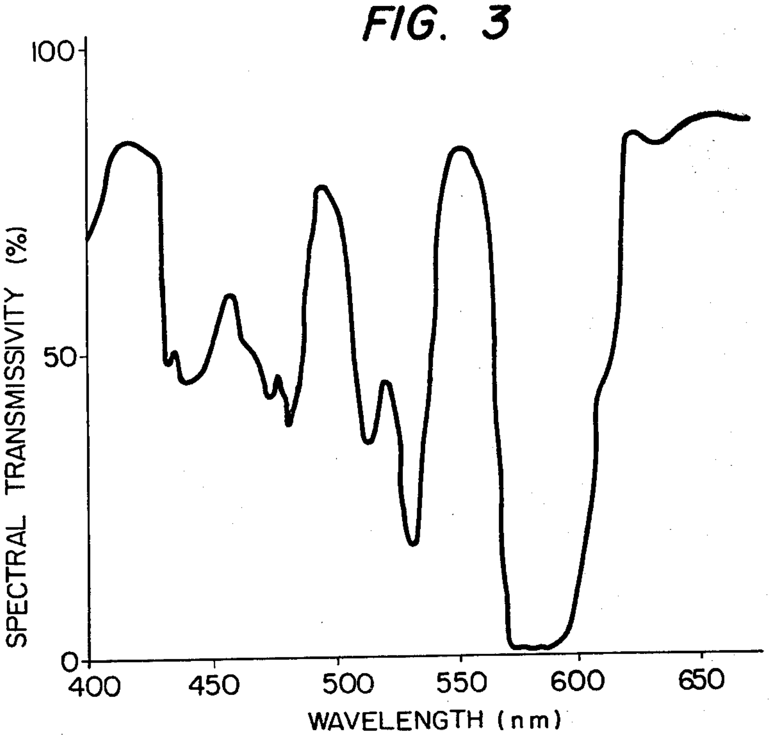
FIG. 3 is a diagram showing the spectral transmissivity characteristic of a face plate glass in FIG. 1.

In the case where the face glass (3) of the cathode ray tube or the vacuum envelope (1) including the face glass is made of glass containing rare earth oxides such as Neodymium oxide ($Nd_2O_3$) and Praseodymium oxide ($Pr_2O_3$), for instance $Nd_2O_3$ shows an optical absorption characteristic over 570 to 585 nm and 513 nm, and $Pr_2O_3$ shows an optical absorption characteristic over 470 to 480 nm. The glass containing the two rare earth oxides is generally called "didymium glass" which has a spectral transmissivity characteristic as shown in FIG. 3. Typical examples of the fluorescent material of a cathode ray tube for a color display light apparatus are ZnS:Ag for blue, $Gd_2O_2S$:Tb for green and $Y_2O_2S$:Eu for red. The emission spectra of these materials are as shown in FIG. 2 for instance. As is apparent from FIG. 2, fluorescent materials showing line spectra are used for green and red. Therefore, if a glass material having a spectral transmissivity characteristic as shown in FIG. 3 is used in combination, external light can be absorbed by a kind of glass, without sacrificing the light emission energy of the fluorescent materials. The glass itself has no particular primary color or a color close thereto. Therefore, in this case, there is no trouble that the face surface shows its primary color resulting in the glass being always colored in a well-lighted place, and both the contrast and the color purity are improved, when compared with the case where a primary color glass is employed.

Figure 4:
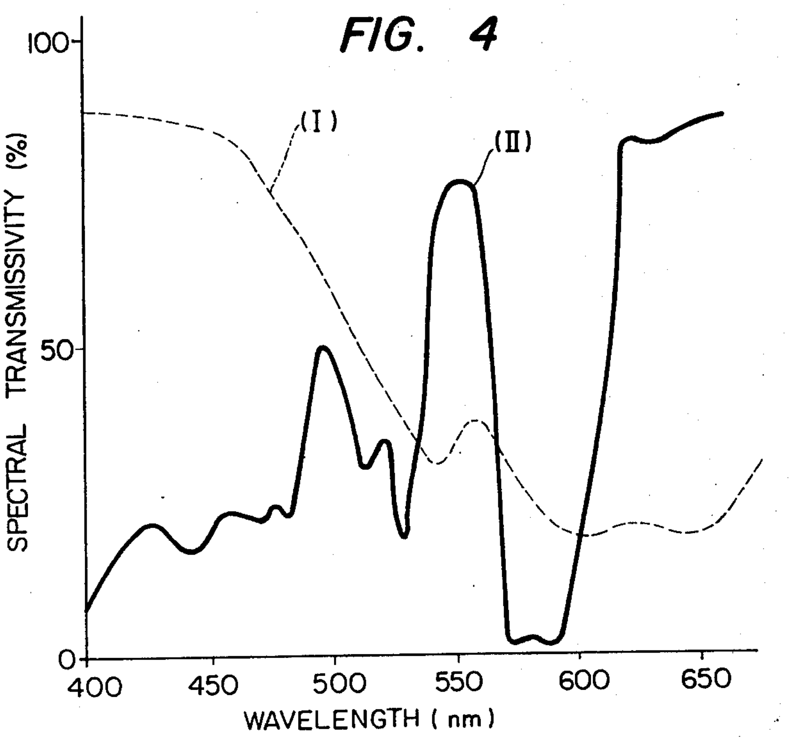
FIG. 4 is a diagram showing the spectral transmissivity characteristic of another face plate glass according to the invention.

When didymium glass is used in combination with blue fluorescent material, it is disadvantageous in that the blue light transmissivity is slightly degraded resulting in the overall contrast being lowered. In order to overcome this drawback, a blue glass containing, for instance, cobalt oxide ($Co_3O_6$) (whose spectral transmissivity characteristic is indicated by the curve (I) in FIG. 4) may be used for blue, and a glass obtained by mixing a suitable amount of iron oxide ($Fe_2O_3$) and cerium oxide ($CeO_2$) with the above-described didymium glass containing $Nd_2O_3$ and $Pr_2O_3$ may be used for green and red. In this case, the performance can be improved. That is, $Nd_2O_3$ shows an optical absorption characteristic locally over 570 to 585 nm and 513 nm, and $Pr_2O_3$ shows an optical absorption characteristic locally over 470 to 480 nm, and the composite of $Fe_2O_3$ and $CeO_2$ increases optical absorption for short wavelength light. The spectral transmissivity characteristic of the glass which is made of these oxides is as indicated by the curve (II) in FIG. 4. If this glass is used in combination with the fluorescent material which has the emission spectrum as shown in FIG. 2, then with respect to green and red, the effect of the sun light can be reduced substantially without decreasing the transmission of emission energy of the fluorescent material. Especially, in the case of green, the use of the glass and the fluorescent material is effective in reducing the effect of external light because the glass transmits rays over a local wavelength range, even when compared with the case where a single-color glass is used. Even when compared with the case where the didymium glass is used for all of the three colors, the efficiency for the emission colors is considerably high, and the effect of external light is greatly eliminated. Thus, the use of the above-described glass is advantageous in performance and in economy especially in the case when the display apparatus is used under the direct sun light.

Furthermore, it has been confirmed that the use of a pigment phosphor whose color is emphasized with a pigment corresponding to the emission color of each fluorescent material provide more excellent effects.

If, in addition to $Nd_2O_3$ and $Pr_2O_3$, Erbium oxide ($Er_2O_3$) showing a significant optical absorption characteristic locally in a wavelength range near 520 nm is mixed, then the effects of the invention are increased.

According to the invention as is described above, the absorption of external light can be increased without sacrificing the emission energy of each fluorescent material, satisfactory color lights and contrast can be obtained under the sun light, and the glass bulb can be made of one or two kinds of glass. Thus, the invention is considerably economically advantageous when compared with the case when the glass bulbs are made of three kinds of color glass.

INDUSTRIAL APPLICABILITY

The present invention is applicable to a large scale display apparatus which provides a satisfactory contrast even in sun light.

I claim:

1. A cathode ray tube for a light source comprising: a vacuum envelope; a fluorescent surface formed on the inner surface of a face plate which is provided at one end of said vacuum envelope, said fluorescent surface adapted to emit light having one of three colors, red, green and blue; and an electron gun for generating a flood electron beam, disposed at the other end of said vacuum envelope in such a manner as to confront said fluorescent surface, at least said face plate of said vacuum envelope being made of a glass material containing oxides $Nd_2O_3$, $Pr_2O_3$, $Fe_2O_3$ and $CeO_2$.

2. A cathode ray tube as claimed in claim (1) wherein said fluorescent surface is made of pigment phosphor.

* * * * *